United States Patent [19]

Gay et al.

[11] 4,447,262

[45] May 8, 1984

[54] DESTRUCTION OF HALOGEN-CONTAINING MATERIALS

[75] Inventors: Richard L. Gay, Canoga Park; Arthur L. Kohl; Samuel J. Yosim, both of Woodland Hills, all of Calif.

[73] Assignee: Rockwell International Corporation, El Segundo, Calif.

[21] Appl. No.: 495,235

[22] Filed: May 16, 1983

[51] Int. Cl.³ .............................................. C22B 7/00
[52] U.S. Cl. ................................... 75/65 R; 75/68 C; 75/69; 75/70; 75/76; 75/77; 75/83; 75/85; 423/497; 423/659; 423/DIG. 12; 210/909
[58] Field of Search ............... 423/497, 659, DIG. 12; 210/909, 755, 758; 275/65 R, 68 C, 69, 70, 76, 77, 83, 85

[56] References Cited

U.S. PATENT DOCUMENTS

| | | | |
|---|---|---|---|
| 3,647,358 | 3/1972 | Greenberg | 23/2 R |
| 3,677,932 | 7/1972 | Hardesty et al. | 208/108 |
| 3,708,270 | 1/1973 | Birk et al. | 48/202 |
| 3,736,250 | 5/1973 | Berg et al. | 208/10 |
| 3,845,190 | 10/1974 | Yosim et al. | 423/184 |
| 3,899,322 | 8/1975 | Yosim et al. | 75/65 R |
| 3,916,617 | 11/1975 | McKenzie et al. | 60/39.02 |
| 3,969,490 | 7/1976 | de Beuckelaer et al. | 423/481 |
| 4,145,396 | 3/1979 | Grantham | 423/22 |
| 4,164,416 | 8/1979 | Gehri | 75/72 |
| 4,246,255 | 1/1981 | Grantham | 423/659 |

OTHER PUBLICATIONS

Wenz, Donald A., Johnson, Irving, and Wolson, Raymond D., "CaCl₂-Rich Region of the CaCl₂-CaF₂-CaO System", *J. Chem. Eng. Data*, 14(2), 252(1969).

Primary Examiner—Edward J. Meros
Assistant Examiner—Steven Capella
Attorney, Agent, or Firm—Henry Kolin; Michael A. Kondzella; H. Fredrick Hamann

[57] ABSTRACT

An organic waste containing halogen is destroyed by treatment in a molten salt pool comprising a mixture of a basic alkaline earth metal compound with an alkaline earth metal halide. An oxygen-containing gas is introduced into the pool containing the waste to produce a gaseous combustion product and to cause the halogen present in the waste to react with the basic alkaline earth metal compound to produce additional alkaline earth metal halide.

13 Claims, 2 Drawing Figures

DESTRUCTION OF HALOGEN-CONTAINING MATERIALS

BACKGROUND OF THE INVENTION

1. Field of the Invention

This invention relates to the destruction of organic materials containing halogen. In one of its more particular aspects this invention relates to a process for destroying halogenated organic materials utilizing a molten salt containing alkaline earth metal compounds.

2. Prior Art

In the destruction of organic materials such as carbonaceous gas, liquid and solid wastes, it has been found desirable to utilize molten salts in order to take advantage of the higher throughput, shorter residence time, and better heat transfer which characterize molten salt processes as well as the uniformity of reaction zone and economy of operation inherent in their use.

Molten salts have been used for conducting various chemical reactions including use as catalysts in hydrocracking processes for decomposing carbonaceous feedstocks with the addition of hydrogen. Molten zinc chloride or zinc chloride mixed with a zinc oxide acceptor has been recommended for this purpose because of the excellent heat transfer characteristics of the molten salt and the continual renewal of fresh catalyst surfaces thereby realized. Another advantage of the use of a molten salt in hydrocracking processes is that contaminants such as catalyst poisons can be withdrawn with a bleed stream of molten salt to allow uninterrupted operation. The use of zinc chloride is not without problems, however, since zinc chloride is highly corrosive at elevated temperatures. Further, hydrocarbons are relatively soluble in molten zinc chloride, which makes separation of the organic and salt phases difficult. In U.S. Pat. Nos. 3,677,932 and 3,736,250 it is suggested that the solubility of hydrocarbons in molten zinc chloride may be substantially reduced by the addition thereto of certain alkali metal halides. These processes are not altogether satisfactory, however, because separation of the hydrocarbon products from the salts is incomplete. Further, the regeneration of such mixed salts is a complex procedure requiring high temperature treatment in a corrosive atmosphere.

Molten salt processes have also used alkali metal carbonates as molten salts.

U.S. Pat. No. 3,708,270 discloses a process for pyrolyzing carbonaceous materials such as solid wastes by use of a molten salt comprising an alkali metal carbonate and from about 1 to 25 wt. % of an alkali metal sulfide.

U.S. Pat. No. 3,845,190 discloses a process for disposing of organic pesticides by means of oxidation in a molten salt comprising an alkali metal carbonate.

U.S. Pat. No. 3,916,617 discloses a process for the partial oxidation and complete gasification of a carbonaceous material such as coal to produce a combustible gas, which utilizes a molten salt comprising an alkali metal carbonate and about 1 to 25 wt. % of an alkali metal sulfide.

U.S. Pat. No. 4,145,396 discloses a process for treating organic wastes containing a radioactive material such as strontium, cesium, iodine or ruthenium with oxygen in a molten salt bath comprising an alkali metal carbonate and from about 1 to 25 wt. % of an alkali metal sulfate.

U.S. Pat. No. 4,246,255 discloses a process for the disposal of polychlorinated biphenyls (PCB's) by oxidation in a molten salt comprising an alkali metal carbonate.

A wide variety of other salts have also been utilized in molten salt processes.

U.S. Pat. No. 3,647,358 discloses the use of ionic, inorganic salts having a melting point in the range of 50° to 600° C. for the oxidation of gaseous, liquid, and solid carbonaceous materials.

Metal recovery has also been realized by means of molten salt processing.

U.S. Pat. No. 3,899,322 discloses a process for recovering valuable metals, particularly noble metals and aluminum, from scrap by introducing metal-containing scrap and oxygen into a molten salt comprising an alkali metal carbonate and about 1 to 25 wt. % of an alkali metal sulfate.

U.S. Pat. No. 4,164,416 discloses a process for recovering copper or lead from a sulfide ore concentrate by introducing the ore concentrate and oxygen into a molten salt comprising an alkali metal carbonate.

While the processes disclosed in the above listed patents are effective for disposing of various wastes and for recovering valuable materials therefrom, none of these processes is wholly satisfactory for treating organic wastes containing halogen. Although the use of alkali metal carbonates provides advantages over other waste disposal methods, the necessity of furnishing alkali metal carbonate make-up to the molten salt bath represents an expense which it would be desirable to reduce.

It is accordingly an object of this invention to provide a more economical process for the destruction of halogen-containing waste materials.

It is another object of this invention to provide such a process wherein very complete destruction of waste materials is obtained by use of a molten salt.

It is another object of this invention to provide such a process wherein the molten salt can be replenished by means of a relatively inexpensive makeup salt material.

It is another object of this invention to provide a process which is effective for the destruction of halogen-containing organic materials and the recovery of metals present therein.

It is another object of this invention to provide a process in which the composition of the molten salt is optimized to provide appropriate physical and chemical properties for the efficient conduct of the waste destruction operation.

It is another object of this invention to provide such a process wherein the halogen content of waste materials is retained in the molten salt.

Another object of this invention is to provide such a process in which practically no halogen-containing compound is emitted in the off gas produced in the process.

It is still another object of this invention to provide a process wherein economical disposal of the spent salt resulting from the molten salt reactions is facilitated.

Other objects and advantages of this invention will become apparent in the course of the following detailed description.

SUMMARY OF INVENTION

In general the present invention provides a process for destroying halogen-containing organic material, such as a halogen-containing waste which utilizes a molten salt containing at least two alkaline earth metal compounds. The process includes the steps of providing a molten salt pool containing both a basic alkaline earth metal compound selected from the group consisting of alkaline earth metal oxides and carbonates and an alkaline earth metal halide; and introducing into the molten salt pool the halogen-containing organic waste and an oxygen-containing gas in an amount sufficient to convert the waste into a gaseous product containing CO, $H_2$, $CO_2$, and $H_2O$ and to cause the halogen present in the waste to react with the alkaline earth metal oxide or carbonate to form an alkaline earth metal halide. The process is advantageous in that, by utilizing an alkaline earth metal oxide or carbonate as the reactant in the molten salt, the cost of the molten salt is minimized and the alkaline earth metal halide produced in the process can be recovered and utilized, for example, as road salt for ice and snow removal. The gaseous product can, depending on its temperature and composition, be used as a source of energy or be vented to the atmosphere in a nonpolluting manner. Those wastes containing metals in addition to halogens can be treated in accordance with the process of this invention to recover metal values therefrom. In general the process of the present invention provides a means of disposing of a halogen-containing waste which is effective, convenient and economical.

DESCRIPTION OF THE PREFERRED EMBODIMENTS

In the treating of halogen-containing wastes by use of a molten salt it is essential to have a basic salt present in the molten salt pool in which the wastes are being treated in order to neutralize any acidic products, such as HCl, formed in the destruction of the waste. Alkali metal carbonates, for example, $Na_2CO_3$, are particularly desirable for this purpose. The basic salt is used up by reaction with HCl, and it is necessary to replenish the supply of basic salt by providing makeup $Na_2CO_3$ which is relatively expensive. $CaCO_3$ or $CaO$ on the other hand, are less expensive chemicals and thus their use in a molten salt process would be desirable.

$CaCO_3$ has not found use in molten salt processes for the reason that, upon heating, it decomposes with the evolution of $CO_2$ and the formation of $CaO$ without melting. In the case of $CaO$, its melting point of 2580° C. is too high to make the use of a pool of molten $CaO$ feasible.

$Na_2CO_3$, on the other hand, melts at approximately 850° C. and has been widely used in molten salt pools. $Na_2O$ has not been used because of its cost and extreme reactivity.

It has now been found that $CaO$ and $CaCO_3$ can be used in molten salt pools by mixing with other calcium salts in which they are soluble at the temperatures required for the efficient destruction of halogen-containing organic wastes. It has also been found that the dissolved $CaO$ and $CaCO_3$ have the ability to react quantitatively with halogen compounds when present in the melt at relatively low concentrations. As a result of these findings, it is possible to use a high melting point material such as $CaO$ as makeup to a molten salt pool which has a low melting point because of the presence of a low melting point salt such as $CaCl_2$ which melts at 772° C. without raising the melting point or viscosity during the course of destruction of the halogenated organic waste. The $CaO$ reacts with the HCl produced to form additional $CaCl_2$, the low melting point salt. The amount of $CaO$ added can be controlled relative to the halogen content of the waste to molten salt pool.

Figure 2:
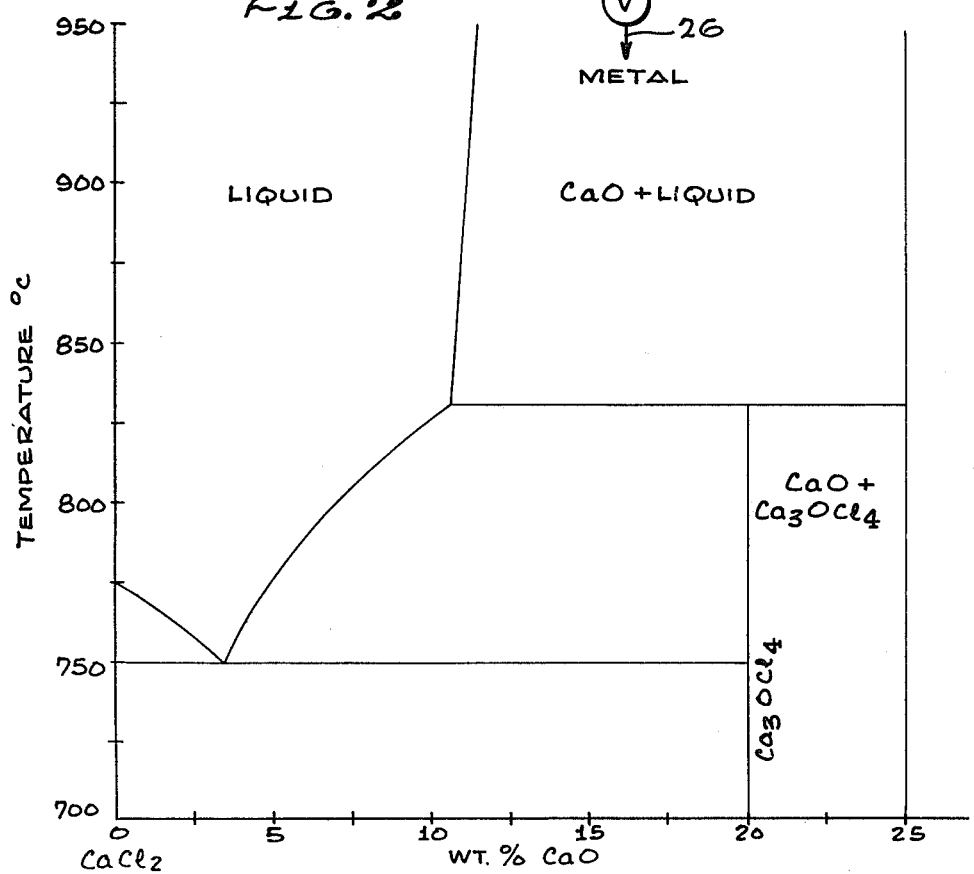
FIG. 2 is a phase diagram of the system $CaO$-$CaCl_2$.

Mixtures of $CaO$ and $CaCl_2$ in which the $CaO$ is present to the extent of about from 2–20 wt. % have been found particularly useful as pool compositions for the destruction of halogenated organic wastes. Below about 2 wt. % there may be insufficient $CaO$ present to react with HCl or other acidic species which may be formed in the destruction of the waste in the molten salt. With concentrations of greater than 20 wt. % $CaO$, the slurry of $CaO$-containing molten salt becomes too thick to provide the desired results, since $CaO$ is soluble in $CaCl_2$ to the extent of only about 11 wt. % at 900° C. This can be seen from FIG. 2 which is a phase diagram of the $CaO$-$CaCl_2$ system within the range of 0–25 wt. % $CaO$ at temperatures in the range of 700°–950° C. taken from Wenz, D. A., Johnson, I., and Wolson, R. D., *J. Chem. Eng. Data*, 14 (2), 252 (1969). From the phase diagram it is clear that at temperatures below about 900° C. lesser quantities of $CaO$ should be used in the melt since the solubility of $CaO$ in $CaCl_2$ decreases as the temperature drops from 900° C. to about 750° C., where a eutectic is formed.

When $CaCO_3$ is used as makeup, it is partially decomposed by the action of heat and molten $CaCl_2$ to form $CO_2$ gas and $CaO$, which dissolves in the melt and reacts with halogen compounds as indicated above. $CaCO_3$ which does not decompose can also react with HCl, in which case $CO_2$ gas is generated by the reaction in which $CaCl_2$ is formed. The $CaCO_3$ decomposition reaction absorbs heat from the system, which represents an additional benefit, since the oxidation of organic wastes normally results in the release of excess heat.

The basic alkaline earth metal salt utilized in the process of the present invention is effective to react with the halogen present in the halogenated waste being treated and to convert the halogen content of the waste to alkaline earth metal halide, which is retained in the melt with essentially no hydrogen halide being evolved from the molten salt pool. Thus, the present invention provides an economical means for conducting the molten salt treatment of a halogen-containing waste material which utilizes a relatively inexpensive alkaline earth metal oxide or carbonate dissolved in the corresponding alkaline earth metal halide.

Salts of other alkaline earth metals such as barium salts can also be used. However, calcium salts are preferred because of their lower cost.

The present invention can be used to treat a wide variety of wastes containing combined halogen atoms. Wastes of this type contain materials such as polychlorinated biphenyls (PCB's), polyvinylchloride and other halogenated monomeric and polymeric organic materials. The combustion of such halogenated organic materials usually results in the release of the halogen atoms in the form of noxious products. For example in the case of chlorinated organics, HCl may be given off, which, because of its corrosive nature is a serious source of environmental pollution and must be neutralized before ultimate disposal. In the process of the present invention, on the other hand, the halogen atoms are retained in the molten salt in the form of alkaline earth metal halides, which can be recovered from the molten salt and used for commercial purposes.

The waste to be treated can be in the form of a gas, liquid or a solid and is readily introduced into the molten salt pool in any convenient manner. In an especially preferred embodiment the waste is introduced into the molten salt by feeding it beneath the surface of the molten salt pool using compressed air or other gas to transport the waste into the molten salt pool.

An oxygen-containing gas is also introduced into the molten salt pool in order to provide partial or complete combustion of the organic content of the halogenated waste material. The oxygen-containing gas may be air, oxygen-enriched air, or pure oxygen. Air is preferred for this purpose because of its low cost and ready availability. For the use of oxygen to be economical the availability of an oxygen plant is a necessity.

The halogenated waste material is thereby converted to a gaseous product the composition of which depends upon the amount of $O_2$ used. Where less than the stoichiometric quantity of $O_2$ for complete oxidation of the halogenated waste is used, a combustible gas containing principally CO and $H_2$ as well as some $CO_2$ and $H_2O$ is produced. Where an excess of $O_2$ is used, on the other hand, a generally noncombustible flue gas is produced, which contains predominantly $CO_2$ and $H_2O$. $N_2$ is present in the gaseous product if air is used as the oxygen-containing gas.

Where the waste being treated contains metals, particularly nonreactive metals such as copper, silver, gold, tin, lead, antimony, bismuth or aluminum, it is possible to recover these metals in the form of the free metal, which can be readily separated from the molten salt pool because of the greater density of the molten metals. Although aluminum is not ordinarily classified as a nonreactive metal, reaction of aluminum with the alkaline earth metal compounds contained within the molten salt pool under the conditions maintained in the process of this invention is insignificant compared to the reaction of aluminum with the more highly reactive alkali metal salts, for example, $Na_2CO_3$. Thus, its behavior with respect to the present invention may be characterized as that of a nonreactive metal.

The temperature of the molten salt pool can be conveniently within the range of about 700°–1400° C. and preferably about 900°–1200° C. The pressure of the vessel in which the molten salt is contained can be ambient or super-atmospheric pressures of about 2 to 50 atmospheres can be used if desired.

Figure 1:
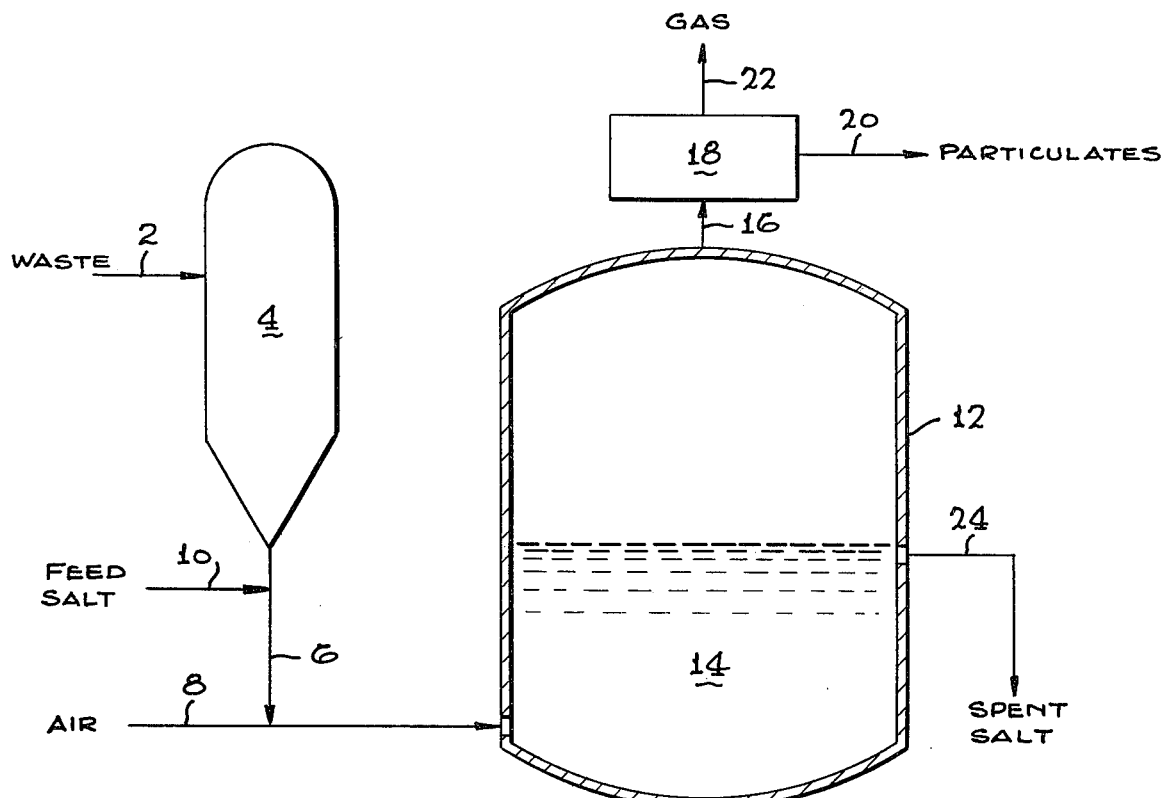
FIG. 1 is a schematic diagram of a preferred embodiment of the process of the present invention.

A preferred embodiment of the present invention will now be described with particular reference to FIG. 1 of the drawing, which shows a molten salt combustor with its appurtenant feeds and product recoveries. A waste material is introduced by means of a conduit 2 into a feed tank 4. From feed tank 4 the waste material is conducted via a conduit 6 to a conduit 8, which is provided with air under pressure. A feed salt for molten salt makeup is introduced via a conduit 10, which connects with conduit 6. Air introduced via conduit 8 serves as a source of $O_2$ and conveys the resulting mixture of feed salt and waste into a molten salt combustor 12, which contains a pool of molten salt 14. Offgases exit molten salt combustor 12 and are conducted via a conduit 16 to an appropriate offgas cleanup system 18, wherein particulates are removed via a conduit 20, and the purified gas is removed to a stack by means of a conduit 22. Overflow molten salt from molten salt combustor 12 is drained via a conduit 24. Metals are removed from molten salt combustor 12 by means of a valved conduit 26.

The invention may be understood by reference to the following examples which are intended to be illustrative of the process of the present invention and not in any way limitative thereof.

EXAMPLE 1

TCB (1, 2, 4-trichlorobenzene) was fed into a molten salt combustor which contained 5.45 kg. (12 lbs). of a mixture of 25 wt % CaO and 75 wt. % $CaCl_2$. The combustor consisted of a 15.2 centimeter ID×91.4 centimeter high (6" ID×36" high) metal vessel mounted within a second metal vessel which served as an outer containment vessel. This second vessel, in turn, was contained in a 20.3 cm ID (8 in.) electric furnace. Air was introduced by means of a 4.1 cm ID (1.6 in.) metal downcomer at a rate of 2.5 scfm. The downcomer was adjusted so that its tip was 1 cm above the bottom of the metal combustor. TCB was fed into the downcomer at a point 22 cm above its tip. TCB concentration was determined in the melt, in the particulates collected from the gas exiting the combustor, and in the particulate-free gas. The results are shown in Tables 1, 2 and 3.

TABLE 1

TEST CONDITIONS FOR WASTE DESTRUCTION TESTS IN A CaO—$CaCl_2$ MELT

| Composition of Waste | Average Melt Temperature (°C.) | Air Feed Rate (scfm) | Waste Feed Rate (g/min) | Waste Feed Rate (lb/hr) | Percent Theoretical Air | Residence Time (sec) |
|---|---|---|---|---|---|---|
| TCB | 1002 | 2.5 | 13.30 | 1.76 | 135.0 | 0.5 |
| TCB | 900 | 2.5 | 13.05 | 1.72 | 137.5 | 0.5 |
| PCB-Liquid | 1000 | 2.5 | 15.00 | 1.98 | 133.0 | 0.25 |
| PCB-Solid | 1003 | 2.5 | 9.0 | 1.19 | 128.0 | 0.25 |

TABLE 2

OFF-GAS COMPOSITIONS FOR WASTE DESTRUCTION TESTS IN A CaO—$CaCl_2$ MELT

| Composition of Waste | Average Melt Temperature (°C.) | % $CO_2$ | % CO | % $O_2$ | % $N_2$ | ppm $NO_x$ | ppm HC* | ppm HCl | Particulates (grains/scf) |
|---|---|---|---|---|---|---|---|---|---|
| TCB | 1002 | 14.4 | 0.06 | 4.7 | 78.4 | 100 | 17 | <2 | 0.47 |
| TCB | 900 | 13.9 | 0.33 | 5.1 | 78.5 | 150 | 20 | 203 | 0.32 |
| PCB-Liquid | 1000 | 16.8 | 0.004 | 4.5 | 77.9 | 7 | 6 | 604 | 1.1 |

TABLE 2-continued

OFF-GAS COMPOSITIONS FOR WASTE DESTRUCTION TESTS IN A CaO—CaCl$_2$ MELT

| Composition of Waste | Average Melt Temperature (°C.) | Off-Gas Composition | | | | | | | Particulates (grains/scf) |
|---|---|---|---|---|---|---|---|---|---|
| | | % CO$_2$ | % CO | % O$_2$ | % N$_2$ | ppm NO$_x$ | ppm HC* | ppm HCl | |
| PCB-Solid | 1003 | 10.2 | 0.02 | 5.1 | 81.7 | 140 | 18 | 72 | 3.2 |

*Hydrocarbons

TABLE 3

DESTRUCTION EFFICIENCIES FOR WASTE DESTRUCTION IN A CaO—CaCl$_2$ MELT

| Composition of Waste | Avg. Melt Temp. (°C.) | Percent of Contaminant Found in | | | Total Percent Contaminant | Destruction and Removal Efficiency[1] (%) | Destruction Efficiency[2] (%) | Contaminant in Gas (mg/m$^3$) |
|---|---|---|---|---|---|---|---|---|
| | | Melt | Particulates | Gas | | | | |
| TCB | 1002 | 2.56 × 10$^{-6}$ | 0.23 × 10$^{-6}$ | 12.8 × 10$^{-6}$ | 15.59 × 10$^{-6}$ | 99.999987 | 99.999984 | 0.023 |
| TCB | 900 | 0.32 × 10$^{-6}$ | 0.19 × 10$^{-6}$ | 33.1 × 10$^{-6}$ | 33.61 × 10$^{-6}$ | 99.999967 | 99.999966 | 0.062 |
| PCB-Liquid | 1000 | 5.3 × 10$^{-6}$ | 4.9 × 10$^{-6}$ | 6.9 × 10$^{-6}$ | 17.1 × 10$^{-6}$ | 99.999988 | 99.999983 | 0.0086 |
| PCB-Solid | 1003 | 190 × 10$^{-6}$ | 28 × 10$^{-6}$ | 780 × 10$^{-6}$ | 998 × 10$^{-6}$ | 99.99919 | 99.99900 | 0.024 |

[1]100% minus the percent of contaminant found in the particulates and particulate-free gas.
[2]100% minus the percent of contaminant found in the melt, particulates, and particulate-free gas.

This example shows that TCB can be destroyed in a molten CaO–CaCl$_2$ mixture to the extent of greater than 99.9999%.

The following example illustrates the destruction of wastes containing PCB's (polychlorinated biphenyls) using the process of the present invention.

EXAMPLE 2

The procedure of Example 1 was followed using two different PCB-containing wastes. The first waste was a liquid waste containing 60 wt. % Aroclor 1260, a commercial PCB-containing product, and 40 wt. % trichlorobenzene. The waste was obtained from a transformer and contained 54.1 wt. % chlorine. The second waste was a solid waste which simulated combustible materials found in PCB-containing capacitors. It contained 64 parts by weight of a mixture of equal parts of polyethylene and paper and 4 parts by weight of a liquid containing 60 wt. % Aroclor 1260 and 40 wt. % of trichlorobenzene. The wastes were fed into the molten salt pool initially containing 14 wt. % CaO and 86 wt. % CaCl$_2$ by means of concentric stainless steel tubes comprising an injector system. The outside surface of the injector was wrapped with ceramic fiber insulation and the injector was positioned 56 cm above the bottom of the tube containing the molten salt. In the case of the liquid waste, droplets of liquid were passed downward through the center tube of the injector system with air being passed downward through the annulus thereof. Solids were fed with about 75% of the air through the center of the injector with the other 25% of the air passing through the annulus for cooling the injector. PCB concentrations were determined in the melt, in the particulates collected from the gas exiting the combustor, and in the particulate-free gas. The results obtained are shown in Tables 1, 2 and 3.

This example shows that liquid PCB's can be destroyed using the process of the present invention to the extent of greater than 99.9999% and that PCB's present in solid wastes can be destroyed to the extent of greater than 99.999%.

The following example illustrates the recovery of a nonreactive metal from a molten salt containing alkaline earth metal compounds.

EXAMPLE 3

A quantity of 454 grams (1 lb) of an 80 wt. % CaCl$_2$ and 20 wt. % CaO mixture was placed in a 4.5-cm ID alumina tube and heated to 980° C. Two liters per minute of argon gas (approximately 0.33 fps) was sparged in the center of the melt at the 7.6-cm level of a 15.2-cm deep quiescent bed. 5-gram increments of aluminum metal were added to the molten salt at approximately 1-min. intervals using 8×20 mesh aluminum spheres. Immediately after the addition of the first 5-gram increment a flame was observed in the upper part of the tube. The flame persisted for 12 minutes during which time no aluminum was added. Then the addition of 5-gram increments of aluminum was started again. After 35 grams of aluminum had been added white particulates appeared in the offgas. These particulates diminished and essentially disappeared by the time 75 grams of aluminum had been added (65 minutes from the initial aluminum addition). Following the addition of the 75 grams of aluminum the argon sparge was continued for 30 minutes. At that time 2 liters per minute air sparge was introduced at 1.3 cm under the surface of the melt. The depth of the sparge was gradually increased until the sparge was 5.1 cm above the bottom of the tube (about 2.5 cm above the surface of the aluminum pool) at which time the melt temperature began to rise at about 1° C. per minute. Sparging at this level was continued for 7 minutes. The sparge was further lowered and at 2.5 cm above the bottom the temperature rose at about 6° C. per minute. After an additional 2 minutes of sparging at this level the melt was quenched by pulling the tube from the furnace and permitting it to cool while suspended in a stainless steel beaker. After cooling, the ceramic tube was broken and the aluminum was recovered by dissolving away the salt. 67.5 Grams of aluminum were found in an essentially spherical mass; 1.5 grams were found in the form of what appeared to be the same size pellets as originally charged; and some aluminum dust which could not be clearly separated from fragments of broken alumina was also detected. The dust weighed about 1 gram. Of the 75 grams of aluminum originally charged, 70 grams were recovered, representing a recovery of 93.33%.

This example illustrates that a $CaCl_2$-$CaO$ molten salt system can be used to recover aluminum.

Thus, the process of the present invention can be used to destroy halogen-containing organic wastes and to recover nonreactive metals from such wastes.

It will, of course, be realized that various modifications can be made to the design and operation of the process of this invention without departing from the spirit thereof. For example, waste materials other than those specifically exemplified herein can be treated according to the process of this invention. Other combinations of alkaline earth metal salts can be utilized as well as mixtures of alkaline earth metal salts with alkali metal salts. In addition, apparatus other than that illustrated in the foregoing description of the present invention can be used if desired. Thus, while the principle, preferred design and mode of operation of the invention have been explained and what is now considered to represent its best embodiment has been illustrated and described, it should be understood that within the scope of the appended claims the invention can be practiced otherwise than as specifically illustrated and described.

What is claimed is:

1. A process for destroying a halogen-containing organic waste which comprises:
   providing a molten salt pool containing a basic alkaline earth metal compound selected from the group consisting of alkaline earth metal oxides and carbonates and an alkaline earth metal halide;
   introducing into said molten salt pool a halogen-containing organic waste and an oxygen-containing gas in an amount sufficient to convert said waste into a gaseous combustion product and to cause the halogen present in said waste to react with said basic alkaline earth metal compound to form additional alkaline earth metal halide.

2. A process according to claim 1 wherein said pool contains CaO.

3. A process according to claim 1 wherein said pool contains $CaCO_3$.

4. A process according to claim 1 wherein said pool contains CaO and $CaCl_2$.

5. A process according to claim 1 wherein said pool comprises a mixture of CaO and $CaCl_2$ containing about 2 to 20 wt. % CaO.

6. A process according to claim 1 wherein said oxygen-containing gas comprises air.

7. A process according to claim 1 wherein said gaseous product comprises a combustible gas.

8. A process according to claim 1 wherein said gaseous product comprises a non-combustible flue gas.

9. A process according to claim 1 wherein a stream of said basic alkaline earth metal compound is continuously or intermittently fed into said pool and a stream of molten salt is continuously or intermittently removed from said pool.

10. A process for treating an organic waste containing halogen and nonreactive metal values which comprises:
    providing a molten salt pool comprising a mixture of a basic alkaline earth metal compound selected from the group consisting of alkaline earth metal oxides and carbonates with an alkaline earth metal halide;
    introducing into said pool a halogen-containing organic waste and an oxygen-containing gas in an amount sufficient to convert said waste into a gaseous combustion product and to cause the halogen present in said waste to react with said basic alkaline earth metal compound to form additional alkaline earth metal halide;
    recovering said gaseous product, said alkaline earth metal halide and said nonreactive metal values from said molten salt pool; and
    adding to said molten salt pool as salt makeup an alkaline earth metal oxide or carbonate.

11. A process according to claim 10 wherein said metal values are selected from the group consisting of copper, silver, gold, tin, lead, antimony, bismuth and aluminum.

12. A process according to claim 10 wherein said metal values are recovered in the form of the molten free metal.

13. A process according to claim 10 wherein a stream of said basic alkaline earth metal compound is continuously or intermittently fed into said pool and a stream of molten salt is continuously or intermittently removed from said pool.

* * * * *